(12) United States Patent
Shaw et al.

(10) Patent No.: US 12,411,519 B2
(45) Date of Patent: Sep. 9, 2025

(54) SYNCHRONIZING CLIENT DEVICE WITH INDEPENDENT SENSOR

(71) Applicant: Niantic Spatial, Inc., San Francisco, CA (US)

(72) Inventors: Christopher Shaw, London (GB); Victor Adrian Prisacariu, Oxford (GB); Daniyar Turmukhambetov, London (GB)

(73) Assignee: Niantic Spatial, Inc., San Francisco, CA (US)

( * ) Notice: Subject to any disclaimer, the term of this patent is extended or adjusted under 35 U.S.C. 154(b) by 68 days.

(21) Appl. No.: 18/204,772

(22) Filed: Jun. 1, 2023

(65) Prior Publication Data

US 2024/0402753 A1    Dec. 5, 2024

(51) Int. Cl.
*G06F 1/12* (2006.01)
(52) U.S. Cl.
CPC ..................... *G06F 1/12* (2013.01)
(58) Field of Classification Search
None
See application file for complete search history.

(56) References Cited

U.S. PATENT DOCUMENTS

| | | | |
|---|---|---|---|
| 10,707,984 B2 * | 7/2020 | Pitigoi-Aron | H04Q 9/04 |
| 10,771,669 B1 * | 9/2020 | Balasubramanian | G01S 17/87 |
| 2016/0197782 A1 * | 7/2016 | Hort | H04L 69/08 709/222 |

FOREIGN PATENT DOCUMENTS

WO   WO-2022160328 A1 *   8/2022   ........... H04N 17/002

OTHER PUBLICATIONS

How works the Precision Time Protocol (PTP)?, Mar. 7, 2022, https://www.bodet-time.com/resources/blog/1774-how-works-the-precision-time-protocol-ptp.html (Year: 2022).*
Kent et al., Universal Serial Bus Device Class Definition for MIDI Devices, Nov. 1, 1999, https://www.usb.org/sites/default/files/midi10.pdf (Year: 1999).*

\* cited by examiner

*Primary Examiner* — Kim Huynh
*Assistant Examiner* — Amanda Mendoza
(74) *Attorney, Agent, or Firm* — Fenwick & West LLP

(57) ABSTRACT

A system includes a first sensor system and a second sensor system. The first sensor system includes a first internal clock, a first sensor configured to generate data describing an environment, and a Universal Serial Bus (USB) module. The second sensor system includes a second internal clock and a controller configured to perform a precision time protocol (PTP) to synchronize the second internal clock with the first internal clock. The precision time protocol includes transmitting timestamped messages encoded in USB bulk messages between the first sensor system and the second sensor system. The timestamped messages may be encoded in USB musical instrument digital interface (MIDI) bulk messages.

20 Claims, 11 Drawing Sheets

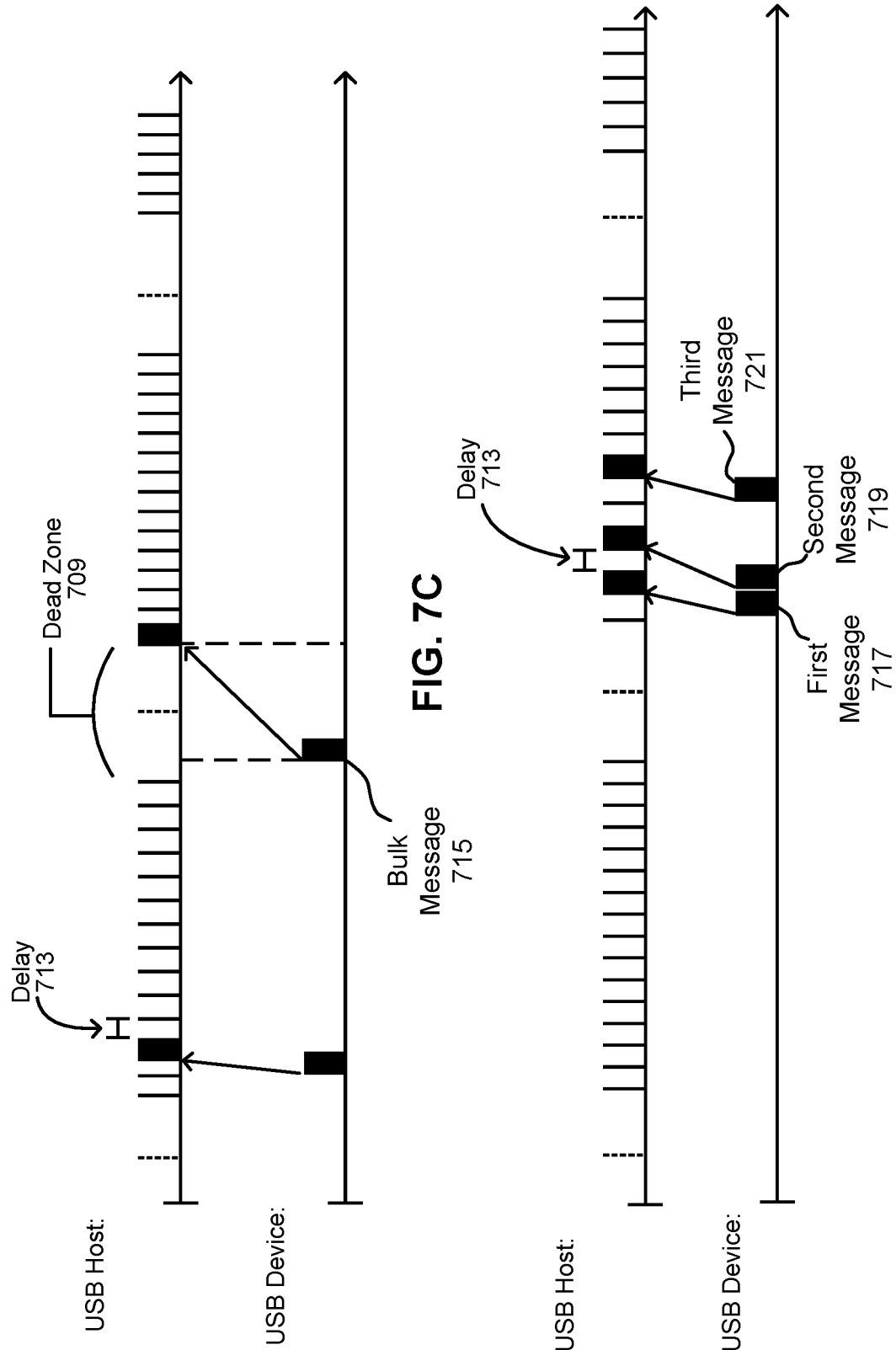

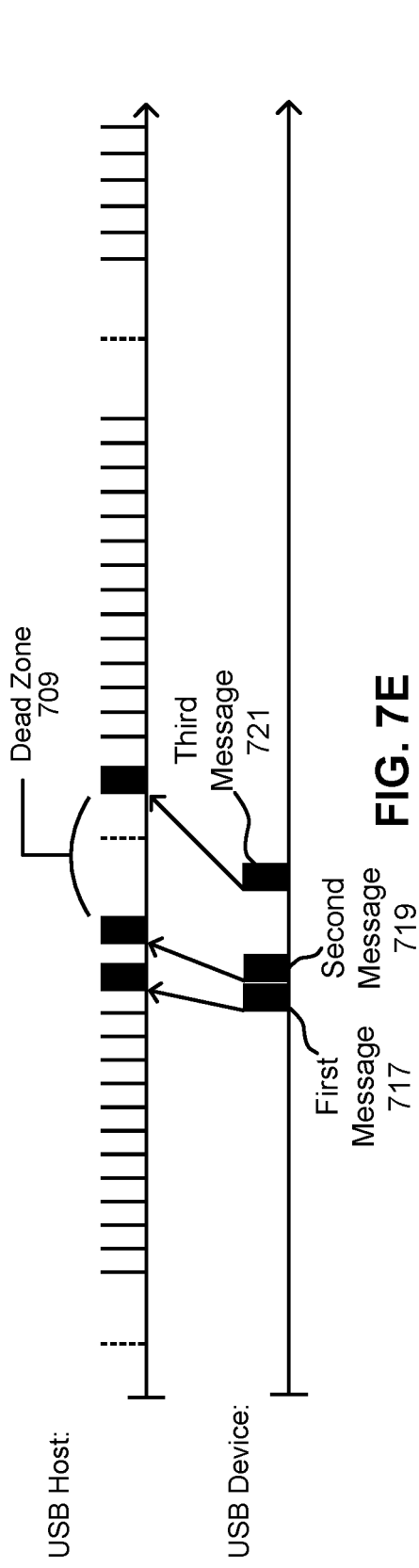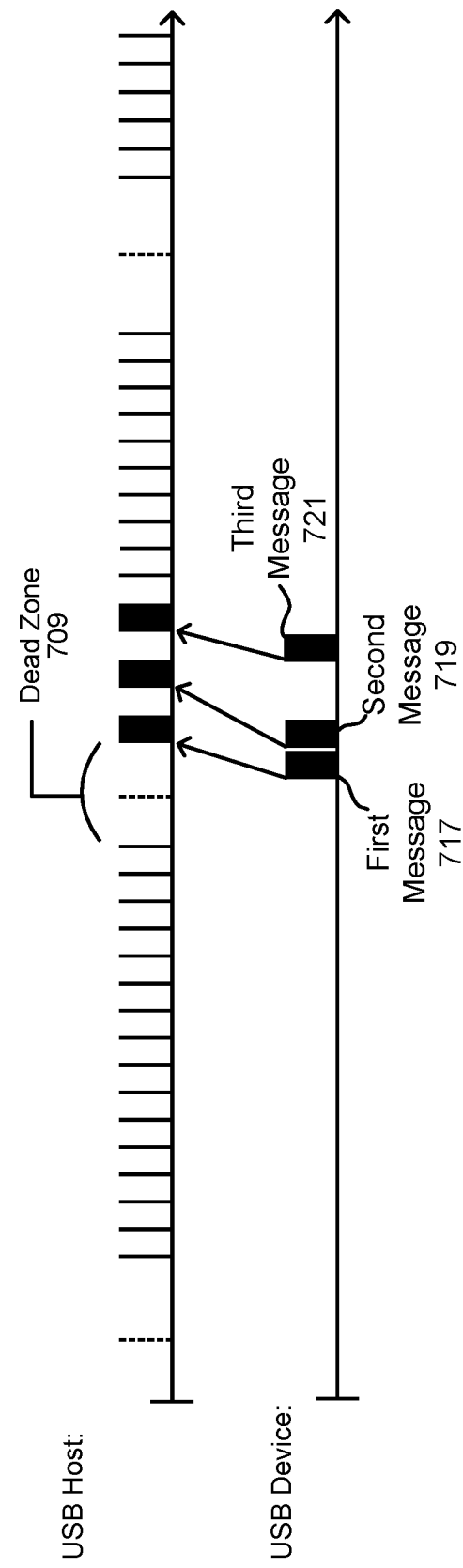

SYNCHRONIZING CLIENT DEVICE WITH INDEPENDENT SENSOR

BACKGROUND

1. Technical Field

The subject matter described relates generally to synchronizing a client device with a separate sensor system.

2. Problem

Client devices, such as smartphones, typically have limited methods for connecting with external devices (e.g., Wi-Fi, Bluetooth, and a Universal Serial Bus (USB) connection). Due to this, client devices cannot be controlled in the same way as sensors with dedicated inputs and outputs that allow a controller to directly control these devices.

SUMMARY

The present disclosure describes a data capture system with multiple sensor systems, such as a first sensor system including a client device (e.g., smartphone) and a second sensor system including a controller and one or more "independent" sensors (e.g., a LIDAR sensor, a RGB camera, an inertial measurement sensor, and a GPS sensor). The data capture system is configured to synchronize sensors of the second sensor system with sensors of the first sensor system. Since many client devices (e.g., smartphones) are not configured to be controlled in the same way as an independent sensor (thus making synchronization between the two systems difficult) the data capture system encodes a precision time protocol (PTP) to pass through a USB port of the smartphone using USB bulk messages (e.g., USB MIDI bulk messages).

In some embodiment, a system includes a first sensor system and a second sensor system. The first sensor system includes a first internal clock, a first sensor configured to generate data describing an environment, and a Universal Serial Bus (USB) module. The second sensor system includes a second internal clock and a controller configured to perform a precision time protocol (PTP) to synchronize the second internal clock with the first internal clock. The precision time protocol includes transmitting timestamped messages encoded in USB bulk messages between the first sensor system and the second sensor system. The timestamped messages may be encoded in USB musical instrument digital interface (MIDI) bulk messages.

The second sensor system may include a sensor configured to capture data describing the environment. In these embodiments, the controller is further configured to, in response to performing the precision time protocol, synchronize data generation of the first sensor with data generation of the second sensor.

To synchronize the second internal clock with the first internal clock, the controller is may be further configured to determine a time delay between the first internal clock and the second internal clock based on the performed precision time protocol, and adjust the second internal clock based on the determined time delay.

In some embodiments, to synchronize the second internal clock with the first internal clock, the controller is further configured to transmit two or more USB bulk messages within a threshold period with known timestamps from the second sensor system to the first sensor system; determine receive timestamps for the two or more USB bulk messages, the receive timestamps describing when the two or more USB bulk messages were received by the first sensor system; and based on the receive timestamps and the known timestamps, determine a bulk message frame boundary of the first sensor system.

BRIEF DESCRIPTION OF THE DRAWINGS

FIG. 7C illustrates an example USB messaging timeline when a connected USB device sends data in a bulk message during a dead zone.

FIGS. 7D-7F illustrate example USB messaging timelines with probing bulk messages, according to some embodiments.

DETAILED DESCRIPTION

The figures and the following description describe certain embodiments by way of illustration only. One skilled in the art will recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described in the context of a parallel reality game that includes augmented reality content in a virtual world geography that parallels at least a portion of the real-world geography such that player movement and actions in the real-world affect actions in the virtual world. The subject matter described is applicable in other situations where event or time synchronizing a client device with another device (external to the client device) is desirable. In addition, the inherent flexibility of computer-based systems allows for a great variety of possible configurations, combinations, and divisions of tasks and functionality between and among the components of the system.

I. Example Location-Based Parallel Reality Game

Figure 1:
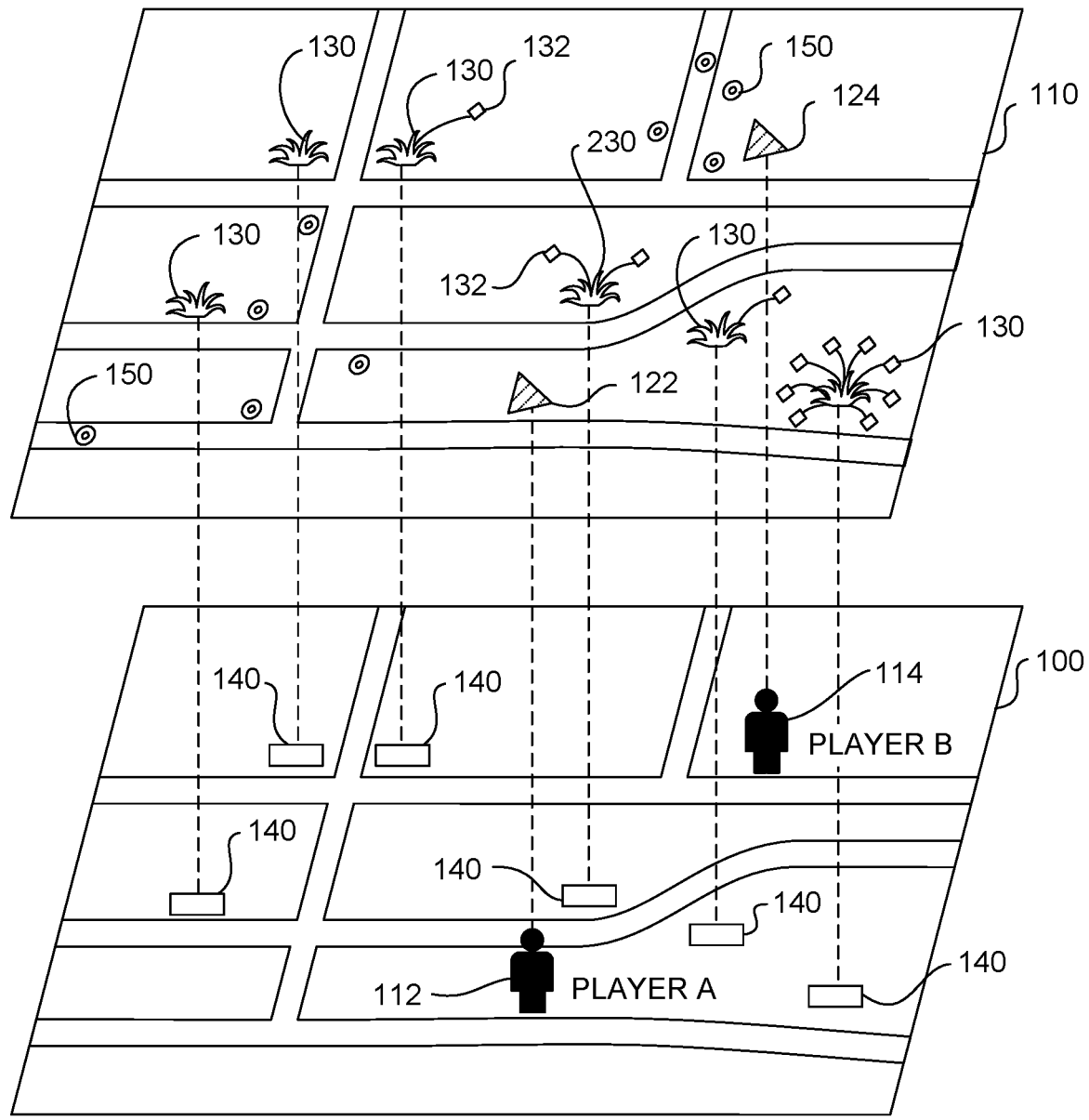
FIG. 1 depicts a representation of a virtual world having a geography that parallels the real world, according to some embodiments.

FIG. 1 is a conceptual diagram of a virtual world 110 that parallels the real world 100. The virtual world 110 can act as the game board for players of a parallel reality game. As illustrated, the virtual world 110 includes a geography that parallels the geography of the real world 100. In particular, a range of coordinates defining a geographic area or space in the real world 100 is mapped to a corresponding range of coordinates defining a virtual space in the virtual world 110. The range of coordinates in the real world 100 can be associated with a town, neighborhood, city, campus, locale, a country, continent, the entire globe, or other geographic area. Each geographic coordinate in the range of geographic coordinates is mapped to a corresponding coordinate in a virtual space in the virtual world 110.

A player's position in the virtual world 110 corresponds to the player's position in the real world 100. For instance, player A located at position 112 in the real world 100 has a corresponding position 122 in the virtual world 110. Similarly, player B located at position 114 in the real world 100 has a corresponding position 124 in the virtual world 110. As the players move about in a range of geographic coordinates in the real world 100, the players also move about in the range of coordinates defining the virtual space in the virtual world 110. In particular, a positioning system (e.g., a GPS system, a localization system, or both) associated with a mobile computing device carried by the player can be used to track a player's position as the player navigates the range of geographic coordinates in the real world 100. Data associated with the player's position in the real world 100 is used to update the player's position in the corresponding range of coordinates defining the virtual space in the virtual world 110. In this manner, players can navigate along a continuous track in the range of coordinates defining the virtual space in the virtual world 110 by simply traveling among the corresponding range of geographic coordinates in the real world 100 without having to check in or periodically update location information at specific discrete locations in the real world 100.

The location-based game can include game objectives requiring players to travel to or interact with various virtual elements or virtual objects scattered at various virtual locations in the virtual world 110. A player can travel to these virtual locations by traveling to the corresponding location of the virtual elements or objects in the real world 100. For instance, a positioning system can track the position of the player such that as the player navigates the real world 100, the player also navigates the parallel virtual world 110. The player can then interact with various virtual elements and objects at the specific location to achieve or perform one or more game objectives.

A game objective may have players interacting with virtual elements 130 located at various virtual locations in the virtual world 110. These virtual elements 130 can be linked to landmarks, geographic locations, or objects 140 in the real world 100. The real-world landmarks or objects 140 can be works of art, monuments, buildings, businesses, libraries, museums, or other suitable real-world landmarks or objects. Interactions include capturing, claiming ownership of, using some virtual item, spending some virtual currency, etc. To capture these virtual elements 130, a player travels to the landmark or geographic locations 140 linked to the virtual elements 130 in the real world and performs any necessary interactions (as defined by the game's rules) with the virtual elements 130 in the virtual world 110. For example, player A may have to travel to a landmark 140 in the real world 100 to interact with or capture a virtual element 130 linked with that particular landmark 140. The interaction with the virtual element 130 can require action in the real world, such as taking a photograph or verifying, obtaining, or capturing other information about the landmark or object 140 associated with the virtual element 130.

Game objectives may require that players use one or more virtual items that are collected by the players in the location-based game. For instance, the players may travel the virtual world 110 seeking virtual items 132 (e.g. weapons, creatures, power ups, or other items) that can be useful for completing game objectives. These virtual items 132 can be found or collected by traveling to different locations in the real world 100 or by completing various actions in either the virtual world 110 or the real world 100 (such as interacting with virtual elements 130, battling non-player characters or other players, or completing quests, etc.). In the example shown in FIG. 1, a player uses virtual items 132 to capture one or more virtual elements 130. In particular, a player can deploy virtual items 132 at locations in the virtual world 110 near to or within the virtual elements 130. Deploying one or more virtual items 132 in this manner can result in the capture of the virtual element 130 for the player or for the team/faction of the player.

In one particular implementation, a player may have to gather virtual energy as part of the parallel reality game. Virtual energy 150 can be scattered at different locations in the virtual world 110. A player can collect the virtual energy 150 by traveling to (or within a threshold distance of) the location in the real world 100 that corresponds to the location of the virtual energy in the virtual world 110. The virtual energy 150 can be used to power virtual items or perform various game objectives in the game. A player that loses all virtual energy 150 may be disconnected from the game or prevented from playing for a certain amount of time or until they have collected additional virtual energy 150.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing their locations.

Figure 2:
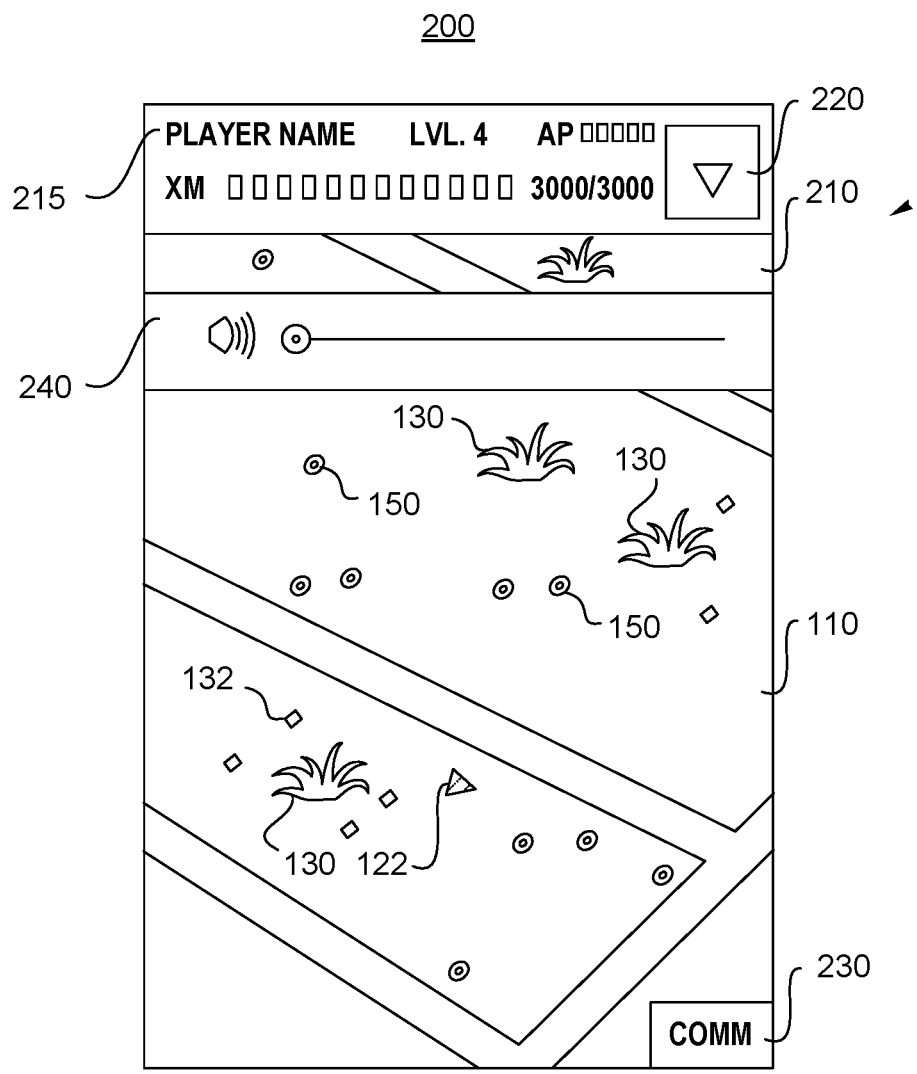
FIG. 2 depicts an exemplary game interface of a parallel reality game, according to some embodiments.

FIG. 2 depicts one embodiment of a game interface 200 that can be presented (e.g., on a player's smartphone) as part of the interface between the player and the virtual world 110. The game interface 200 includes a display window 210 that can be used to display the virtual world 110 and various other aspects of the game, such as player position 122 and the locations of virtual elements 130, virtual items 132, and virtual energy 150 in the virtual world 110. The user interface 200 can also display other information, such as game data information, game communications, player information, client location verification instructions and other information associated with the game. For example, the user interface can display player information 215, such as player name, experience level, and other information. The user interface 200 can include a menu 220 for accessing various game settings and other information associated with the game. The user interface 200 can also include a communications interface 230 that enables communications between the game system and the player and between one or more players of the parallel reality game.

According to aspects of the present disclosure, a player can interact with the parallel reality game by carrying a client device around in the real world. For instance, a player can play the game by accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 200 can include non-visual elements that allow a user to interact with the game. For instance, the game interface can provide audible notifications to the player when the player is approaching a virtual element or object in the game or when an important event happens in the parallel reality game. In some embodiments, a player can control these audible notifications with audio control 240. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. Players may also be able to obtain enhanced "powers" or virtual items that can be used to complete game objectives within the game.

Those of ordinary skill in the art, using the disclosures provided, will appreciate that numerous game interface configurations and underlying functionalities are possible. The present disclosure is not intended to be limited to any one particular configuration unless it is explicitly stated to the contrary.

II. Example Gaming System

Figure 3:
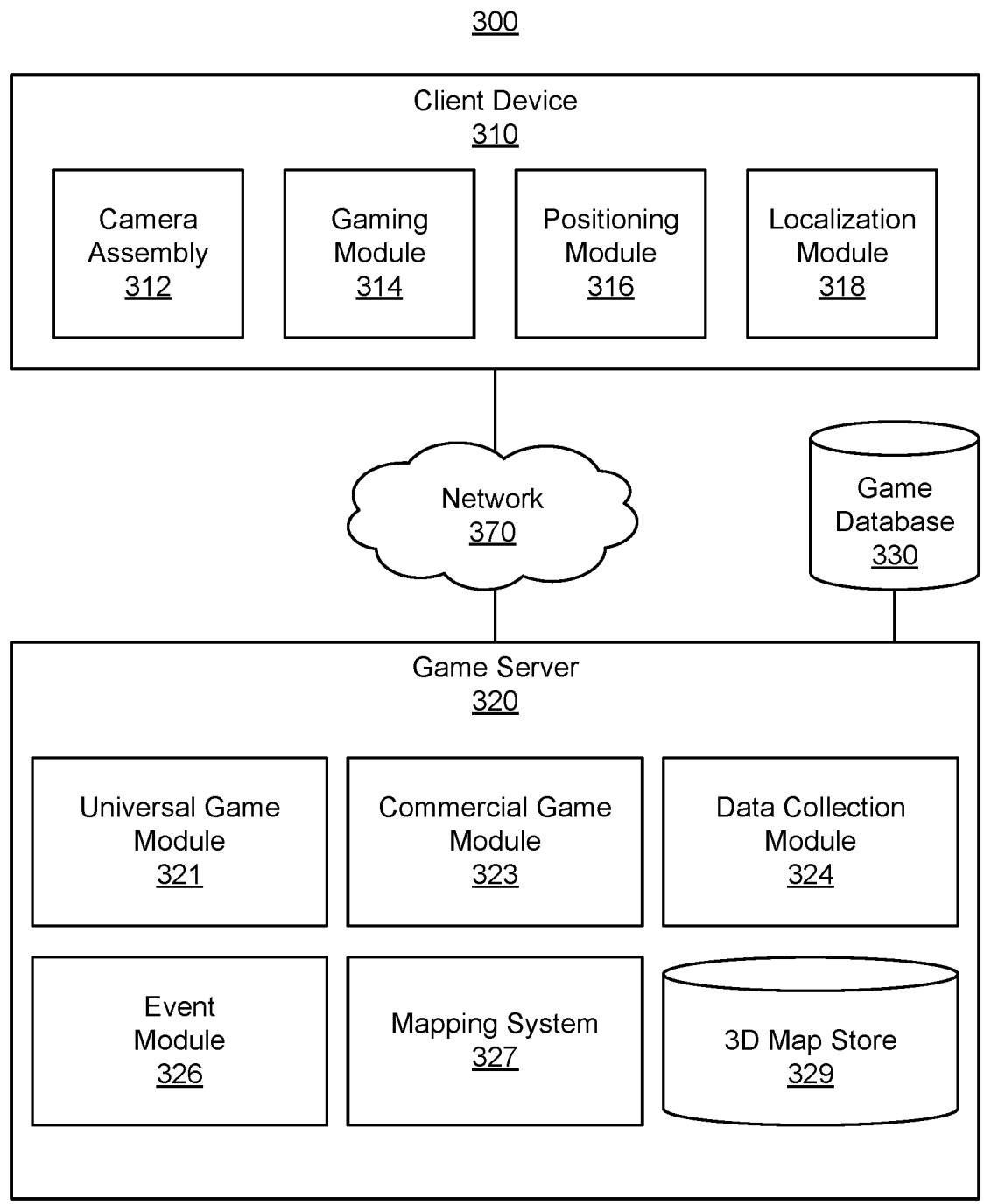
FIG. 3 illustrates one embodiment of a networked computing environment, according to some embodiments.

FIG. 3 illustrates one embodiment of a networked computing environment 300. The networked computing environment 300 uses a client-server architecture, where a game server 320 communicates with a client device 310 over a network 370 to provide a parallel reality game to a player at the client device 310. The networked computing environment 300 also may include other external systems such as sponsor/advertiser systems or business systems. Although only one client device 310 is shown in FIG. 3, any number of client devices 310 or other external systems may be connected to the game server 320 over the network 370. Furthermore, the networked computing environment 300 may contain different or additional elements and functionality may be distributed between the client device 310 and the server 320 in different manners than described below.

The networked computing environment 300 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 310 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 310.

A client device 310 can be any portable computing device capable for use by a player to interface with the game server 320. For instance, a client device 310 is preferably a portable wireless device that can be carried by a player, such as a smartphone, portable gaming device, augmented reality (AR) headset, cellular phone, tablet, personal digital assistant (PDA), navigation system, handheld GPS system, or other such device. For some use cases, the client device 310 may be a less-mobile device such as a desktop or a laptop computer. Furthermore, the client device 310 may be a vehicle with a built-in computing device.

The client device 310 communicates with the game server 320 to provide sensory data of a physical environment. In one embodiment, the client device 310 includes a camera assembly 312, a gaming module 314, positioning module 316, and localization module 318. The client device 310 also includes a network interface (not shown) for providing communications over the network 370. In various embodiments, the client device 310 may include different or additional components, such as additional sensors, display, and software modules, etc.

The camera assembly 312 includes one or more cameras which can capture image data. The cameras capture image data describing a scene of the environment surrounding the client device 310 with a particular pose (the location and orientation of the camera within the environment). The camera assembly 312 may use a variety of photo sensors with varying color capture ranges and varying capture rates. Similarly, the camera assembly 312 may include cameras with a range of different lenses, such as a wide-angle lens or a telephoto lens. The camera assembly 312 may be configured to capture single images or multiple images as frames of a video.

The client device 310 may also include additional sensors for collecting data regarding the environment surrounding the client device, such as movement sensors, accelerometers, gyroscopes, barometers, thermometers, light sensors, microphones, etc. The image data captured by the camera assembly 312 can be appended with metadata describing other information about the image data, such as additional sensory data (e.g. temperature, brightness of environment, air pressure, location, pose etc.) or capture data (e.g. exposure length, shutter speed, focal length, capture time, etc.).

The gaming module 314 provides a player with an interface to participate in the parallel reality game. The game server 320 transmits game data over the network 370 to the client device 310 for use by the gaming module 314 to provide a local version of the game to a player at locations remote from the game server. In one embodiment, the gaming module 314 presents a user interface on a display of the client device 310 that depicts a virtual world (e.g. renders imagery of the virtual world) and allows a user to interact with the virtual world to perform various game objectives. In some embodiments, the gaming module 314 presents images of the real world (e.g., captured by the camera assembly 312) augmented with virtual elements from the parallel reality game. In these embodiments, the gaming module 314 may generate or adjust virtual content according to other information received from other components of the client device 310. For example, the gaming module 314 may adjust a virtual object to be displayed on the user interface according to a depth map of the scene captured in the image data.

The gaming module 314 can also control various other outputs to allow a player to interact with the game without requiring the player to view a display screen. For instance, the gaming module 314 can control various audio, vibratory, or other notifications that allow the player to play the game without looking at the display screen.

The positioning module 316 can be any device or circuitry for determining the position of the client device 310. For example, the positioning module 316 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, IP address analysis, triangulation and/or proximity to cellular towers or Wi-Fi hotspots, or other suitable techniques.

As the player moves around with the client device 310 in the real world, the positioning module 316 tracks the position of the player and provides the player position information to the gaming module 314. The gaming module 314 updates the player position in the virtual world associated with the game based on the actual position of the player in the real world. Thus, a player can interact with the virtual world simply by carrying or transporting the client device 310 in the real world. In particular, the location of the player in the virtual world can correspond to the location of the player in the real world. The gaming module 314 can provide player position information to the game server 320 over the network 370. In response, the game server 320 may enact various techniques to verify the location of the client device 310 to prevent cheaters from spoofing their locations. It should be understood that location information associated with a player is utilized only if permission is granted after the player has been notified that location information of the player is to be accessed and how the location information is to be utilized in the context of the game (e.g. to update player position in the virtual world). In addition, any location information associated with players is stored and maintained in a manner to protect player privacy.

The localization module 318 provides an additional or alternative way to determine the location of the client device 310. In one embodiment, the localization module 318 receives the location determined for the client device 310 by the positioning module 316 and refines it by determining a pose of one or more cameras of the camera assembly 312. The localization module 318 may use the location generated by the positioning module 316 to select a 3D map of the environment surrounding the client device 310 and localize against the 3D map. The localization module 318 may obtain the 3D map from local storage or from the game server 320. The 3D map may be a point cloud, mesh, or any other suitable 3D representation of the environment surrounding the client device 310. Alternatively, the localization module 318 may determine a location or pose of the client device 310 without reference to a coarse location (such as one provided by a GPS system), such as by determining the relative location of the client device 310 to another device.

In one embodiment, the localization module 318 applies a trained model to determine the pose of images captured by the camera assembly 312 relative to the 3D map. Thus, the localization model can determine an accurate (e.g., to within a few centimeters and degrees) determination of the position and orientation of the client device 310. The position of the client device 310 can then be tracked over time using dead reckoning based on sensor readings, periodic re-localization, or a combination of both. Having an accurate pose for the client device 310 may enable the gaming module 314 to present virtual content overlaid on images of the real world (e.g., by displaying virtual elements in conjunction with a real-time feed from the camera assembly 312 on a display) or the real world itself (e.g., by displaying virtual elements on a transparent display of an AR headset) in a manner that gives the impression that the virtual objects are interacting with the real world. For example, a virtual character may hide behind a real tree, a virtual hat may be placed on a real statue, or a virtual creature may run and hide if a real person approaches it too quickly.

The game server 320 includes one or more computing devices that provide game functionality to the client device 310. The game server 320 can include or be in communication with a game database 330. The game database 330 stores game data used in the parallel reality game to be served or provided to the client device 310 over the network 370.

The game data stored in the game database 330 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); or (8) any other data used, related to, or obtained during implementation of the parallel reality game. The game data stored in the game database 330 can be populated either offline or in real time by system administrators or by data received from users (e.g., players), such as from a client device 310 over the network 370.

In one embodiment, the game server 320 is configured to receive requests for game data from a client device 310 (for instance via remote procedure calls (RPCs)) and to respond to those requests via the network 370. The game server 320 can encode game data in one or more data files and provide the data files to the client device 310. In addition, the game server 320 can be configured to receive game data (e.g. player positions, player actions, player input, etc.) from a client device 310 via the network 370. The client device 310 can be configured to periodically send player input and other updates to the game server 320, which the game server uses to update game data in the game database 330 to reflect any and all changed conditions for the game.

In the embodiment shown in FIG. 3, the game server 320 includes a universal game module 322, a commercial game module 323, a data collection module 324, an event module 326, a mapping system 327, and a 3D map store 329. As mentioned above, the game server 320 interacts with a game database 330 that may be part of the game server or accessed remotely (e.g., the game database 330 may be a distributed database accessed via the network 370). In other embodiments, the game server 320 contains different or additional elements. In addition, the functions may be distributed among the elements in a different manner than described.

The universal game module 322 hosts an instance of the parallel reality game for a set of players (e.g., all players of the parallel reality game) and acts as the authoritative source for the current status of the parallel reality game for the set of players. As the host, the universal game module 322 generates game content for presentation to players (e.g., via their respective client devices 310). The universal game module 322 may access the game database 330 to retrieve or store game data when hosting the parallel reality game. The universal game module 322 may also receive game data from client devices 310 (e.g. depth information, player input, player position, player actions, landmark information, etc.) and incorporates the game data received into the overall parallel reality game for the entire set of players of the parallel reality game. The universal game module 322 can also manage the delivery of game data to the client device 310 over the network 370. In some embodiments, the universal game module 322 also governs security aspects of the interaction of the client device 310 with the parallel reality game, such as securing connections between the client device and the game server 320, establishing connections between various client devices, or verifying the location of the various client devices 310 to prevent players cheating by spoofing their location.

The commercial game module 323 can be separate from or a part of the universal game module 322. The commercial game module 323 can manage the inclusion of various game features within the parallel reality game that are linked with a commercial activity in the real world. For instance, the commercial game module 323 can receive requests from external systems such as sponsors/advertisers, businesses, or other entities over the network 370 to include game features linked with commercial activity in the real world. The commercial game module 323 can then arrange for the inclusion of these game features in the parallel reality game on confirming the linked commercial activity has occurred. For example, if a business pays the provider of the parallel reality game an agreed upon amount, a virtual object identifying the business may appear in the parallel reality game at a virtual location corresponding to a real-world location of the business (e.g., a store or restaurant).

The data collection module 324 can be separate from or a part of the universal game module 322. The data collection module 324 can manage the inclusion of various game features within the parallel reality game that are linked with a data collection activity in the real world. For instance, the data collection module 324 can modify game data stored in the game database 330 to include game features linked with data collection activity in the parallel reality game. The data collection module 324 can also analyze data collected by players pursuant to the data collection activity and provide the data for access by various platforms.

The event module 326 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The mapping system 327 generates a 3D map of a geographical region based on a set of images. The 3D map may be a point cloud, polygon mesh, or any other suitable representation of the 3D geometry of the geographical region. The 3D map may include semantic labels providing additional contextual information, such as identifying objects tables, chairs, clocks, lampposts, trees, etc.), materials (concrete, water, brick, grass, etc.), or game properties (e.g., traversable by characters, suitable for certain in-game actions, etc.). In one embodiment, the mapping system 327 stores the 3D map along with any semantic/contextual information in the 3D map store 329. The 3D map may be stored in the 3D map store 329 in conjunction with location information (e.g., GPS coordinates of the center of the 3D map, a ringfence defining the extent of the 3D map, or the like). Thus, the game server 320 can provide the 3D map to client devices 310 that provide location data indicating they are within or near the geographic area covered by the 3D map.

The network 370 can be any type of communications network, such as a local area network (e.g. intranet), wide area network (e.g. Internet), or some combination thereof. The network can also include a direct connection between a client device 310 and the game server 320. In general, communication between the game server 320 and a client device 310 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

This disclosure makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes disclosed as being implemented by a server may be implemented using a single server or multiple servers working in combination. Databases and applications may be implemented on a single system or distributed across multiple systems. Distributed components may operate sequentially or in parallel.

In situations in which the systems and methods disclosed access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

III. Data Capture System

Figure 4:
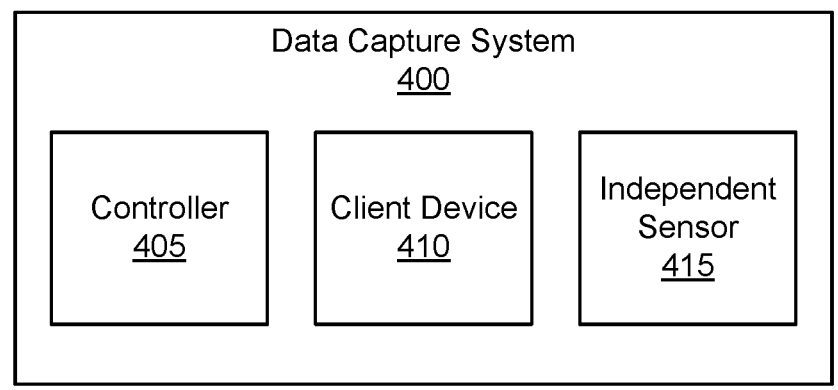
FIG. 4 is a diagram of a data capture system, according to some embodiments.

FIG. 4 is a diagram of a data capture system 400, according to some embodiments. The data capture system 400 may generate data used to implement or enhance a parallel reality game. The data capture system 400 includes a client device 410 (with one or more sensors), an independent sensor 415, and a controller module 405 communicatively coupled to the client device 410 and the independent sensor 415. The data capture system 400 synchronizes sensors of the client device 410 and the independent sensor 415 to capture data at the same or similar time. Sensors of the client device 410 and the independent sensor 415 may be aligned or positioned so they have an overlapping field of view of the environment. The data capture system 400 may be a portable assembly that a user can carry through the environment to capture synchronized data describing the environment. The data capture system 400 can include additional, fewer, or different components than as illustrated in FIG. 4. For example, the data capture system 400 may include multiple different independent sensors 415.

Synchronization occurs by the controller module 405 matching its internal clock with the internal clock of the client device 410. Thus, when data is generated by different sensors (e.g., a sensor of the client device 410 and the independent sensor 415), timestamps of the data across those different sensors are consistent with each other (within a threshold time synchronization error).

Synchronized data captured from different sensor types (including data from a client device 410) may be useful for many reasons. For example, if the independent sensor 415 is the same as or similar to a sensor of the client device 410 (e.g., the independent sensor 415 is a high-end version of the client device sensor), the accuracy of the client device sensor can be determined by comparing synchronized data from both sensors. In another example, if the independent sensor 415 is a depth sensor (e.g., a LIDAR sensor), depth data can be used with images from the client device 410 to train a depth estimation model (where the depth data is used as ground truth). These two examples may be generally useful, but they may also be useful for implementing or enhancing a parallel reality game. For example, a trained depth estimation model may be installed on a user's client device 310 to display augmented reality objects. Separately, synchronized data from the data capture system 400 may also be used to generate a 3D map of an environment (e.g., by the mapping system 327). As previously described, 3D maps of the real world (e.g., 100) may be used to construct a virtual world (e.g., 110) of a parallel reality game.

The controller module 405 controls operations of the data capture system 400. The controller module 405 may be implemented as hardware, software, or some combination thereof. For example, the controller module 405 is implemented via one or more integrated circuit field-programmable gate arrays (FPGAs), one or more application-specific integrated circuits (ASICs), or some combination thereof. As indicated in the previous sentence, the controller module 405 can refer to multiple components (working individually or together). For example, the controller module 405 includes a microcontroller for I/O and a timer/clock component that implements an internal clock. The controller module 405 is coupled to the client device 410 and independent sensor 415 (e.g., via wired connections).

The independent sensor 415 is a sensor configured to generate data describing an external environment. The independent sensor 415 is distinguished from sensors of the client device (e.g., the independent sensor 415 is not contained in or part of the client device 410). The data capture system 400 may include a plurality of different independent sensors 415, such as a camera or a depth sensor (e.g., LIDAR). Independent sensors 415 may have dedicated inputs and outputs that allow the controller module 405 to directly control these devices. For example, the controller module 405 can transmit an instruction to hardware of the independent sensor 415 that triggers the independent sensor 415 to begin capturing data.

The client device 410 is a portable computing device (e.g., a smartphone) that includes a camera assembly (e.g., 312) and a positioning module (e.g., 316). The client device may also include other possible components/sensors, such as a localization module (e.g., 318), movement sensors, accelerometers, gyroscopes, microphones, etc. The client device 410 may be an example of client device 310 described with respect to FIG. 3. Contrary to the independent sensor 415, the client device 410 does not have dedicated inputs as described above and thus the controller module 405 cannot directly control sensors of the client device in the same way as the independent sensor 415. For example, the client device 410 manufacture intentionally configured the client device 410 to have only a limited number of methods for connecting with external devices (e.g., Wi-Fi, Bluetooth, and a Universal Serial Bus (USB) connection) and these limited connection methods do not allow the controller module 405 the same degree of control as the independent sensor 415.). For example, the controller module 405 cannot transmit an instruction directly to a sensor of the client device 410 to begin capturing data. Furthermore, the communication methods may be modified to further limit the amount of control an external device can have over the client device 410. For example, although the client device 410 may be capable of communicating via a USB connection, the manufacture may have added additional constraints, wrappers, lockdowns, etc., that limit communication via the USB protocols. For example, the client device 410 only allows MIDI (musical instrument digital interface) and HID (Human Interface Device) communication protocols over USB. In these cases, MIDI may be advantageous over HID since HID may be limited to interrupt messages (e.g., for mice and keyboard data), which may not have the advantages associated with USB bulk messages as further described below.

Due to the limited methods for communicating with and controlling the client device 410, the controller module 405 may communicate with the client device 410 via a USB connection. Although there are different types of USB messages, USB bulk messages allow for passing high frequency successive messages between devices. Since the client device 410 includes a MIDI driver and the MIDI protocol uses bulk messages, the controller module 405 may communicate with the client device 410 via USB MIDI bulk messages (in some embodiments, the controller module 405 only communicates with the client device 410 via USB MIDI bulk messages). Among other advantages, MIDI enables low level scheduling to access the internal clock for more accurate message timestamping.

The data capture system 400 may include additional sensors for collecting data regarding the environment, such as movement sensors, accelerometers, gyroscopes, barometers, thermometers, light sensors, and microphones.

Note that the client device 410 may also be referred to as a sensor system (e.g., a "first" sensor system), and the controller module 405 and independent sensor 415 may also be referred to as a sensor system (e.g., a "second" sensor system).

Although some embodiments of the data capture system 400 are described in the context of a parallel reality game, the data capture system 400 may be applicable to other areas where it is desirable to event or time synchronize a client device with another device (external to the client device).

III.A Synchronization

Figure 5:
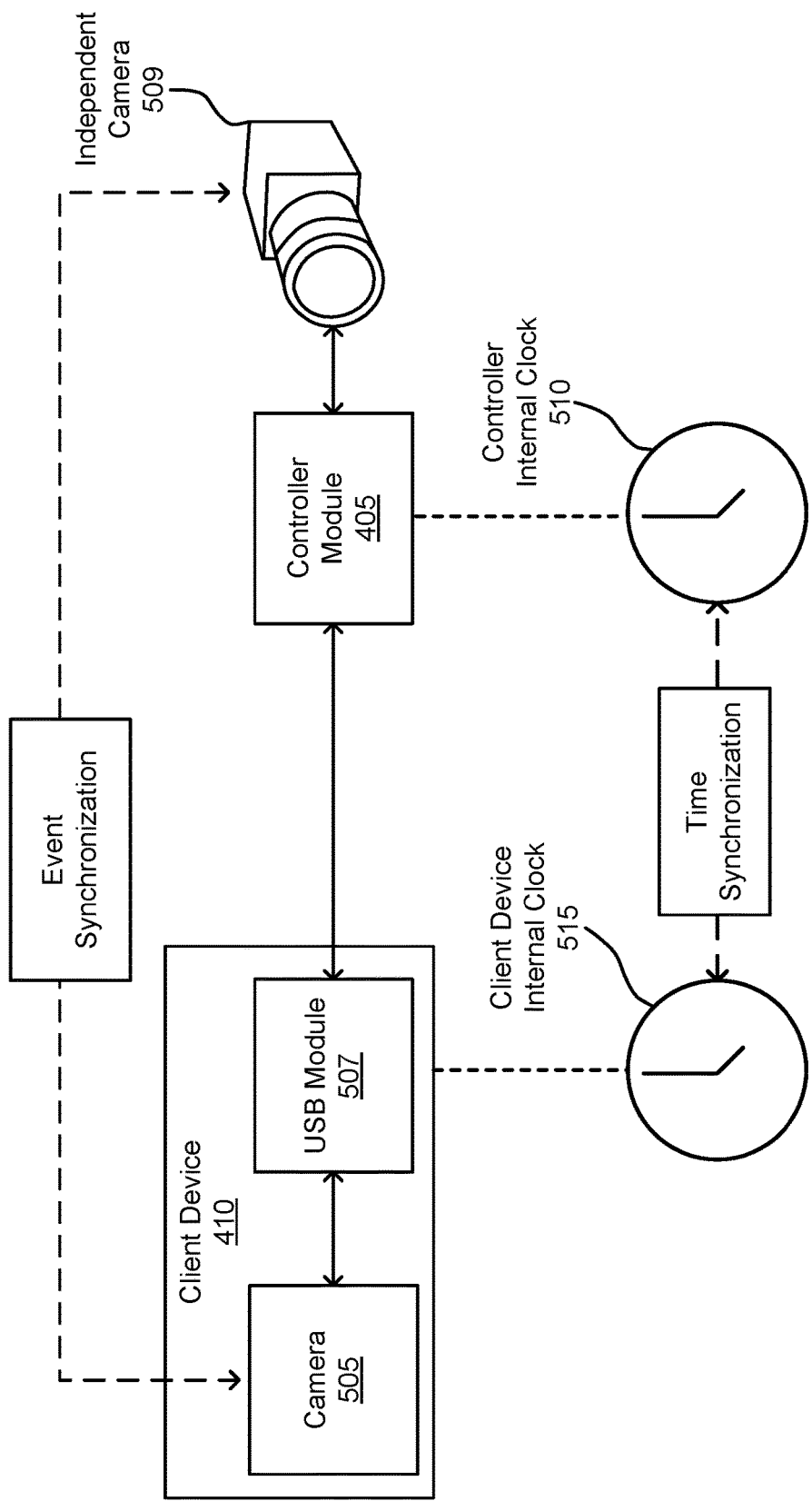
FIG. 5 is a diagram that illustrates synchronization among components of the data capture system, according to some embodiments.

FIG. 5 is a diagram that illustrates synchronization among components of the data capture system 400, according to some embodiments. FIG. 5 includes the client device 410 (with a camera 505 and USB module 507), the controller module 405, an independent camera 509, a client device internal clock 515, and a controller internal clock 510. The camera 505 is an example sensor of the client device 410, and the independent camera 509 is an example independent sensor 415 (the diagram of FIG. 5 is also applicable to other sensors of the client device 410 and other independent sensors 415). The camera 505 is communicatively coupled to the USB module 507; the USB module 507 is communicatively coupled to the controller module 405; and the controller module 405 is communicatively coupled to the independent camera 509 (signified by solid lines).

As previously described, due to limited access to the client device 410 via a hardware connection, the controller module 405 may be hardware coupled to the client device 410 via USB. For example, the controller module 405 is coupled to the client device 410 via a USB cable and communicates with the USB module 507 via a USB protocol (e.g., transmitting and receiving USB MIDI messages). The USB module 507 is a USB driver (e.g., including USB firmware) and associated hardware to implement USB messages. A portion or all of the USB module 507 may implemented on the main SoC (system-on-a-chip) of the client device 410 or a separate dedicated chip in the client device 410.

The camera 505 and the independent camera 509 are said to be "event synchronized" if both devices capture an image at approximately the same time (e.g., within a threshold event synchronization error) or at a controlled delay from one another (e.g., within a threshold event synchronization error). Event synchronization may occur by programming the client device 410 (e.g., via a mobile application) to notify the controller module 405 (e.g., via a USB MIDI bulk message sent by the USB module 507) when the camera 505 captures an image (e.g., the message includes a timestamp of the captured image) or when the camera 505 is expected to capture an image (e.g., based on prior messages or their estimated frequency). Responsive to receiving this notification message, the controller module 405 instructs the independent camera 509 to capture an image as well, resulting in both devices capturing images at approximately the same time. In some embodiments, instead of waiting for the notification message, the controller module 405 estimates when the notification message will be received and instructs the independent camera 509 based on this prediction, thus improving event synchronization (e.g., the controller module 405 has frequency locking or averaging functionality where it uses time-stamping or older messages to predict future ones). The inventors were able to achieve an event synchronization on the order of one millisecond. It may be desirable for event synchronization errors to be (1) less than the exposure time of either of the sensors, (2) no larger than single-digit milliseconds, (3) less than one millisecond (e.g., 100-500 microseconds puts the event synchronization in the same ballpark as other independent (e.g., industrial) sensors), or (4) some combination thereof.

However, even if the camera 505 and independent camera 509 are event synchronized, the timestamps of the images may have different values (which may make data synchronization difficult) since the client device 410 timestamps images according to internal clock 515, the controller module 405 timestamps images from the independent camera 509 according to internal clock 510, and the internal clocks 510, 515 may be independent of each other. If the internal clocks 510, 515 are synchronized with each other (within a threshold time synchronization error), the system is said to be "time synchronized." Time synchronization may be performed using a precision time protocol (PTP), which is described with respect to FIG. 6.

III.B Precision Time Protocol

Figure 6:
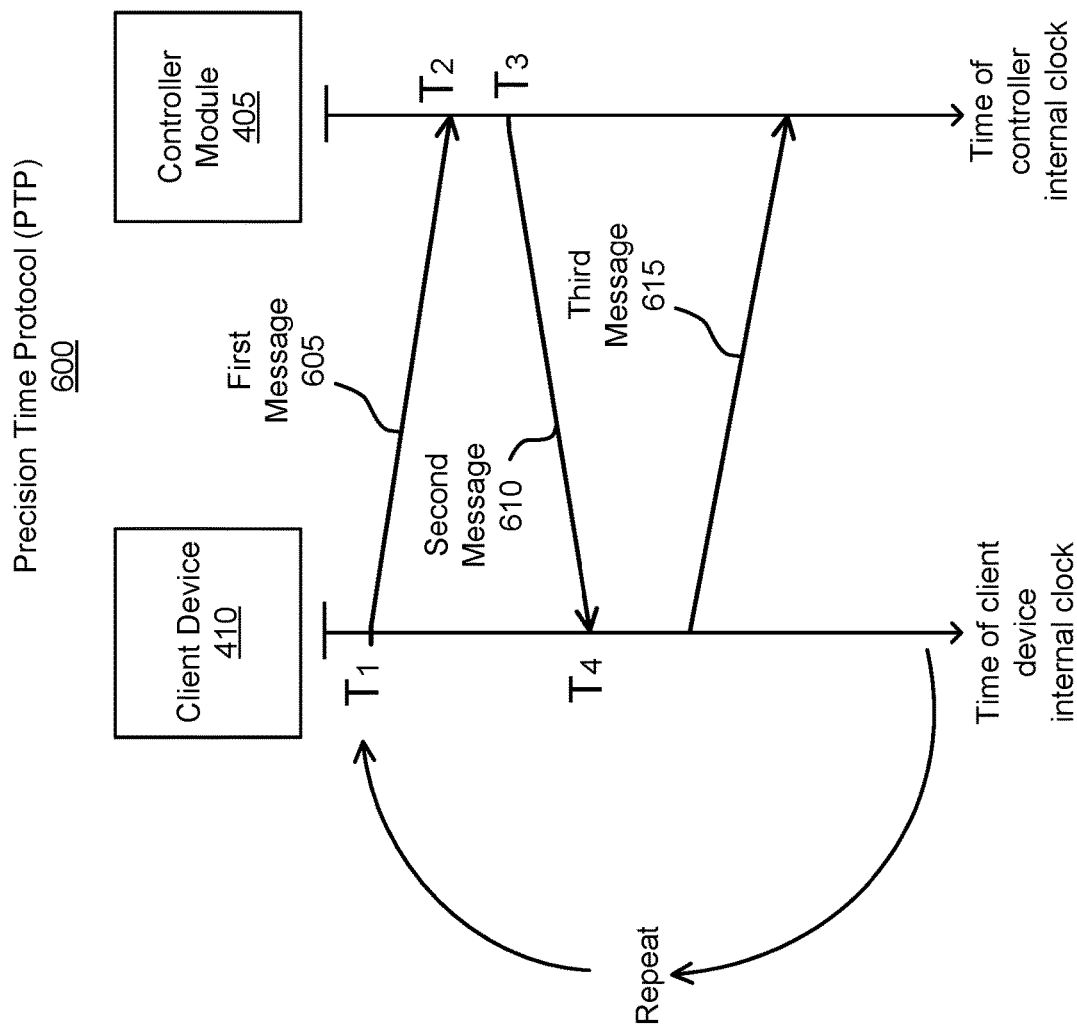
FIG. 6 is an interaction diagram illustrating a precision time protocol between a client device and a controller, according to some embodiments.

FIG. 6 is an interaction diagram illustrating a precision time protocol 600 between the client device 410 and the controller module 405, according to some embodiments. Among other advantages, the precision time protocol 600 enables the controller module 405 to determine the time of the client device internal clock 515 (the client device 410 may not make this information directly accessible) and estimate transmission delays across the connection between the controller module 405 and the client device 410. At time $T_1$ (according to internal clock 515), the client device 410 transmits the first message 605 to the controller module 405. The first message 605 contains the timestamp at which it was sent (i.e., $T_1$). Due to the limited communication protocols of the client device 410, the first message 605 may be encoded as a USB MIDI bulk message. The controller module 405 receives the encoded first message 605 at time $T_2$ (according to its internal clock 510). The controller module 405 applies the timestamp $T_2$ to the first message 605. At time $T_3$ (according to internal clock 510), the controller module 405 transmits a second message 610 to the client device 410. The second message 610 may also be encoded as a USB MIDI bulk message. When the client device 410 receives the second message 610 at time $T_4$ (according to its internal clock 515), it records that timestamp. Among other advantages, encoding the second message 610 as a USB MIDI bulk message may result in reduced lag between the client device 410 receiving the message and the client device 410 accessing the internal clock 515 to determine the receipt time (i.e., $T_4$). At a later time, the client device 410 transmits the timestamp $T_4$ in a third message 615 to the controller module 405. The third message 615 may also be encoded as a USB MIDI bulk message. After receiving the third message 615, the controller module 405 now has timestamps $T_1$-$T_4$, which is may be used to calculate offsets between the internal clocks and estimate transmission delays across the connection between the controller module 405 and the client device 410. The controller module 405 may then use this information to adjust its internal clock 510 to match the internal clock 515 of the client device 410. In some embodiments, the precision time protocol 600 includes additional messages. For example, in embodiments where the client device 410 doesn't determine timestamp $T_1$ until the first message 605 is sent, the precision time protocol 600 may include an additional message sent after the first message 605 that includes time $T_1$ (in this example, the first message 605 is a message initiating the precision time protocol (e.g., an initial synchronization message) but doesn't include timestamp $T_1$).

As indicated in FIG. 6, the precision time protocol 600 may repeat periodically (e.g., every second) to keep the controller internal clock 510 synchronized with the client device internal clock 515 (e.g., to prevent or reduce clock drift). Using the precision time protocol 600, the inventors were able to synchronize the internal clocks within ~130 microseconds of each other. In some embodiments, it is preferrable to have time synchronization errors (1) less than one millisecond, (2) less than 300 microseconds (e.g., 100-300 microseconds), or (3) some combination thereof. Note that 100-300 microseconds may make the time synchronization on the same order of magnitude as a typical smartphone camera's exposure duration in bright conditions (e.g., near-direct sunlight).

In some cases, the delay between client device camera 505 capturing an image and the client device 410 timestamping that image is unknown. For example, this 'black-box system' may timestamp at the start or end of exposure (or some middle average) and this knowledge may be unknown. In another example, the client device 410 may apply an unknown constant offset. In another example, the client device 410 may have an unknown random or variable delay (aka jitter). The example delay contributors described above may be unknown, for example, if the client device manufacturer does not release the appropriate documentation. Thus, one or more tests may be performed to determine this delay (in other words, the delay between camera 505 capturing an image and the client device 410 timestamping that image). For example, the data capture system 400 may be arranged so the camera 505 and independent camera 509 capture an image of a shared clock, such as a millisecond timer or an LED matrix clock (e.g., a matrix of LEDs, where a new LED turns on every new time period (e.g., every millisecond)). The images from each device can be compared to determine this delay. Among other advantages, an LED matrix clock can also be used to (1) determine the exposure time of camera 505 and (2) determine when a timestamp for an image is generated (e.g., start of exposure, end of exposure, or a time in between). After the delay is determined, the controller module 405 can account for this delay by adjusting its internal clock 510 (e.g., apply an appropriate offset).

III. C Bulk Message Probing

The following descriptions with respect to FIGS. 7A-7F, describe 'probing' methods that may be an extension to the precision time protocol over USB techniques previously described. Embodiments that implement these probing methods may improve the precision time protocol over USB techniques by further decreasing the event or time synchronization errors. Note, that the following descriptions refer to a "USB host" and a "USB device." Depending on the implementation, the controller 405 may act as the USB device and the client device 410 (e.g., via the USB module 507) may act as the USB host. However, the opposite may also be true (the controller 405 acts as the USB device and the client device 410 acts as the USB Host. In either case, the client device 410 (acting as either the USB host or device) has unknown USB message timing and the controller 405 (acting as either the USB host or device) can provide known (e.g., and precise) USB message timing.

A relatively large amount of timing jitter (and therefore synchronization error) can arise due to the way USB communication is forcibly split into intervals. (Intervals are referred to as "frames" for USB 1.0/1.1, "micro frames" for USB 2.0, and "bus-intervals" for USB 3.0. The following descriptions refer to frames for ease of discussion, however the descriptions also apply to the other types of intervals of USB). According to current implementations of USB, the USB host limits how many data packets can be placed into a single frame and the USB host also controls the timing and priority of those packets by sending "start of frame" (SOF) messages at regular intervals (every 1 millisecond for USB 1.1).

Figure 7A:
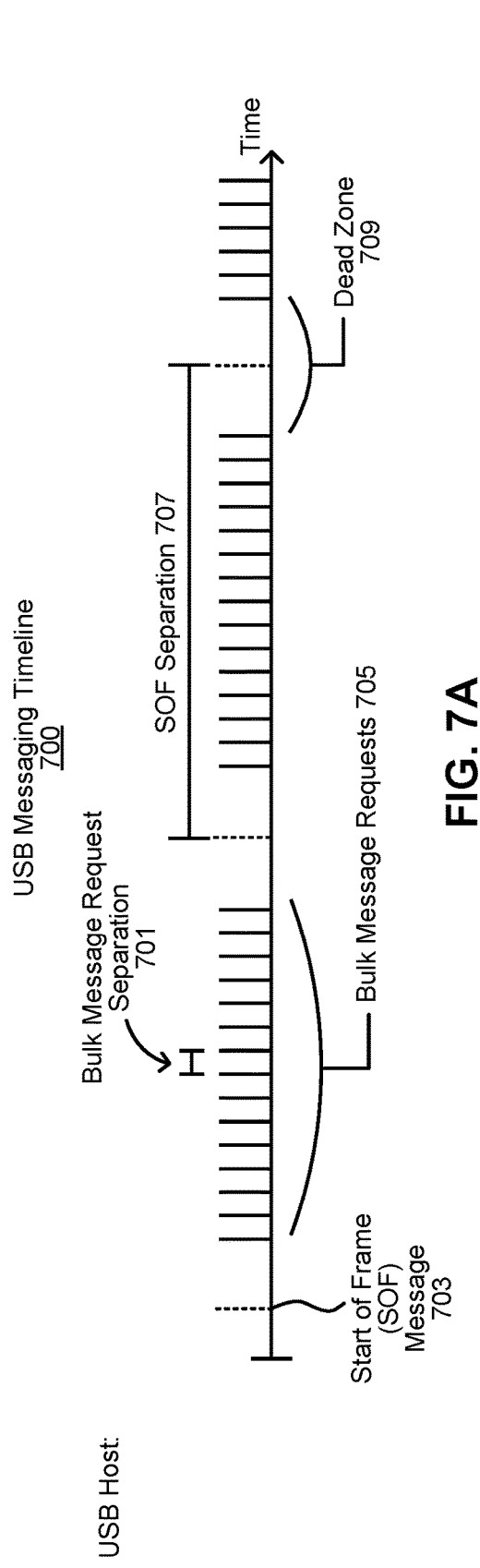
FIG. 7A is a diagram of an example USB messaging timeline for bulk messages of a USB host.

FIG. 7A is a diagram of an example USB messaging timeline 700 for bulk messages of a USB host. Note that other types of USB messages (e.g., interrupt messages) are ignored for ease of discussion. Each start of frame (SOF) message 703 is indicated by a dotted line and bulk message requests 705 for data are indicated by solid lines. The time between SOF messages is referred to as the SOF separation 707 (e.g., ~1 millisecond). Bulk message requests 705 are requests for a USB device connected to the USB host to send data to or receive data from the USB host via a bulk message. The USB host requests data frequently (e.g., a request every ~60 microseconds), except for the dead zones 709 before and after the SOF messages 703. During a dead zone 709, no bulk messages can be transferred. The dead zone 709 can be significantly larger than the separation between bulk message requests 705. Note that non-bulk messages (e.g., interrupt type) may be prioritized before bulk messages. Thus, the presence of non-bulk messages may increase the dead zone 709 (the probing methods may enable detection of this).

Figure 7B:
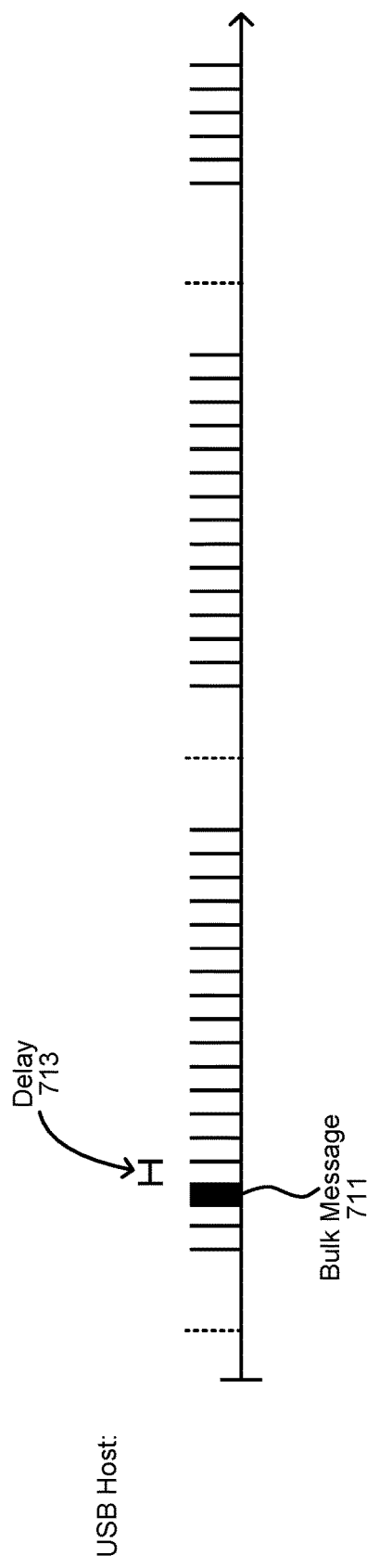
FIG. 7B illustrates an example USB messaging timeline when a connected USB device sends or receives data in a bulk message.

FIG. 7B illustrates an example USB messaging timeline when a connected USB device sends or receives data in a bulk message 711 (assuming the bulk message timing doesn't collide with a dead zone 709). After the bulk message 711 to/from the USB device is transferred, there is a delay 713 between the bulk message 711 and the next bulk message request 705 (in other words, there is a delay before the USB host is ready to handle additional bulk messages). The delay 713 is not typically standardized and may depend on the USB host implementation, but it is typically similar to the request separation 701 between sequential bulk message requests 705 (in this example, ~60 microseconds).

However, if a bulk message (with data) is ready to be sent or received during a dead zone 709, the message is delayed until the next bulk message request is initiated. This will usually be a significantly longer delay that the separation 701 between bulk message requests 705. An example of this longer delay is provided below with respect to FIG. 7C.

FIG. 7C includes example USB messaging timelines for the USB host (e.g., the USB module 507) and a USB device (e.g., the controller module 405). In FIG. 7C, a bulk message (with data) 715 is ready to be transmitted from the USB Device to the USB host. However, the bulk message 715 became ready to transmit during a dead zone 709. Thus, receipt of the bulk message 715 by the USB host is delayed. Specifically, the bulk message 715 must wait until the next bulk message request 705 occurs in the next frame, which is significantly longer than the typical separation 701 between message requests 705 (in this example, >>60 microseconds). This type of 'dead zone delay' may cause a significant amount of jitter (and thus synchronization error) between the USB host and device, especially in situations where the precise timing of bulk messages is important. For example, if any messages from a precision time protocol (e.g., messages 605, 610, or 615) experience dead zone delay, this can negatively impact the controller module's 405 calculations for determining offsets between the internal clocks or estimate transmission delays across the connection between the controller module 405 and the client device 410.

Thus, to reduce synchronization error, it may be helpful to determine if a bulk message 'collides' with a dead zone or to determine the timing of the dead zones (e.g., when dead zones occur and their duration). For example, a device (either the USB host or USB device) may transmit bulk messages outside of the dead zones to reduce or avoid dead zone delays. In another example, if bulk messages of a precision time protocol occur during a dead zone, they may be accounted for differently than messages that occur outside of a dead zone (e.g., the controller module 405 adjusts its internal clock 510 differently depending on whether the messages experienced dead zone delays).

However, in many situations, the timing of dead zone durations isn't known or controllable, and the USB host may need to be treated like a black box (e.g., the USB host is a separate device designed by a manufacturer that doesn't release this information). In these situations, a novel probing method may be used to determine the timing of dead zones.

Probing methods include probing the USB host with multiple 'probe' bulk messages to determine dead zone timing. Specifically, instead of sending a single bulk message, multiple probe bulk messages are sent as known times to identify the presence of a dead zone 709 (different timing patterns can be affected by a dead zone delay in different measurable ways.). In the following examples, two messages are sent close together (e.g., so the second message arrives at the next possible bulk request after the first message arrives (so less than 60 microseconds in this example), and the third message is sent at a known delay after the second message 719, (however other timing patterns may be used). In the following examples, the delay is a multiple of the bulk message request separation 701 (~60 microseconds in the current example). Note that, in the examples of FIGS. 7D-7F, three probing bulk messages 717, 719, and 721 are sent to the USB host, however as few as two messages used in conjunction may be used. The number of probing messages and the timing patter of those probing messages may depend on properties of the USB host, properties of the USB device, and the amount of control over both of those devices.

In the example of FIG. 7D, none of the probing bulk messages collide with a dead zone. Thus, the three messages 717, 719, and 721 are received by the USB host as expected. Messages 717 and 719 are separated from each other by delay 713 (which is approximately the bulk request separation 701 (~60 microseconds in this example)), and messages 719 and 721 are separated by the known delay (rounded-up to the nearest multiple of the bulk request separation 701). The received timestamps (reflecting when the probing messages were received by the USB host) may be determined by the USB host transmitting a confirmation or failure message to the USB device for each probing message. In situations where the USB host is the client device 410 and the USB device is the controller 405, the USB Messaging timeline 700 may be unknown (e.g., treated as a black box). Thus, the controller 405 may send the messages 717, 719, and 721 at the timings previously discussed. By examining the received timestamps, the controller module 405 can determine none of these probing messages collided with a dead zone. In situations where the USB host is the controller 405 and the USB device is the client device 410, the USB Messaging timeline 700 may be known, however, the USB device may not understand when to send messages. Thus, the USB device may be instructed to send probing messages 717, 719, and 721.

However, the there are situations where the probing messages can collide with a dead zone. In a first example, the probing messages arrive at the end of the bulk request window such that one or more later messages collide with the dead zone and become delayed until the next bulk message request in the next frame. In the example of FIG. 7E, the first and second messages (717 and 719) are transmitted at the end of a frame, but the third message 721 is transmitted during the dead zone 709 and isn't received until the next frame. Thus (assuming the USB host is the client device 410 and the USB device is the controller 405), by examining the timestamps (which reflect when the messages were received by the USB host), the controller module 405 can determine that a dead zone 709 occurred between the second and third messages (719 and 721).

In a second example, the probing messages may arrive before a bulk request window begins such that one or more of the earlier messages collied with the dead zone and become delayed until the first bulk message request occurs. In the example of FIG. 7F, the first and second messages (717 and 719) are transmitted during the dead zone 709 and are thus delayed. This dead zone collision results in the USB host packing all three messages together since the first two messages (717 and 719) were blocked from being received until the dead zone 709 cleared. This results in the delay between the second and third messages (719 and 721) at the USB host being smaller than the known delay between the second and third messages (as transmitted by the USB device). Thus (assuming the USB host is the client device 410 and the USB device is the controller 405), by examining the received timestamps of the probing messages, the controller module 405 can determine that a dead zone 709 was present when the first and second messages (717 and 719) were transmitted.

As stated earlier, probing bulk messages (e.g., 717, 719, and 721) may be part of a precision time protocol (e.g., see FIG. 6). If the controller module 405 determines a set of probing bulk messages collided with a dead zone, the controller module 405 may disregard messages from that precision time protocol cycle. In this case, the controller module 405 may wait until the precision time protocol is repeated again and then use the new timestamps to synchronize its internal clock 510 (assuming probing messages in the new precision time protocol cycle don't collide with a dead zone). Alternatively, the controller module 405 may adjust the one or more parameters of the next precision time protocol cycle to reduce the likelihood of probing messages colliding with a dead zone. For example, the controller module 405 may adjust the (e.g., relative) times that a message of the precision time protocol cycle (e.g., 605, 610, or 615) is transmitted/received. In another example, the controller module 405 may change the frequency of subsequent precision time protocol cycles or change the start time of the next precision time protocol cycle.

Note that the example timings and terminologies provided in the descriptions of FIGS. 7A-7F (e.g., the message request separation of 60 microseconds and the SOF separation of ~1 milliseconds) were derived from the USB 1.1 standard and example real-world USB hosts using this standard. However, these example timings and specific terminologies are not required. Other timings and terminologies, such as those used in the USB 2.0 or 3.0 standard, are also applicable (e.g., the above descriptions of frames are also applicable to the micro frames of the USB 2.0 standard and the bus-intervals of USB 3.0). More generally the same kind of message probing approach may be used to determine more precise timing from any master/host-led communication interface like USB (e.g., I2C) within limits that messaging delays are consistent.

Furthermore, the probing techniques described above may work better under the constraint that a single USB device occupies the USB host, but this is not required and multi-device regimes may be implemented, for example, by accepting a lower success rate or by actively monitoring other devices to avoid message collisions.

As previously stated, the probing methods may be an extension to the precision time protocol over USB techniques previously described. For example, referring to FIG. 6, any of the messages (605, 610, or 615) of the precision time protocol 600 may be implemented using two or more probing messages. This may enable the controller module 405 to determine whether any of timestamps of the PTP messages (605, 610, or 615) were affected by dead zone delay.

III.D Example Methods

Figure 8:
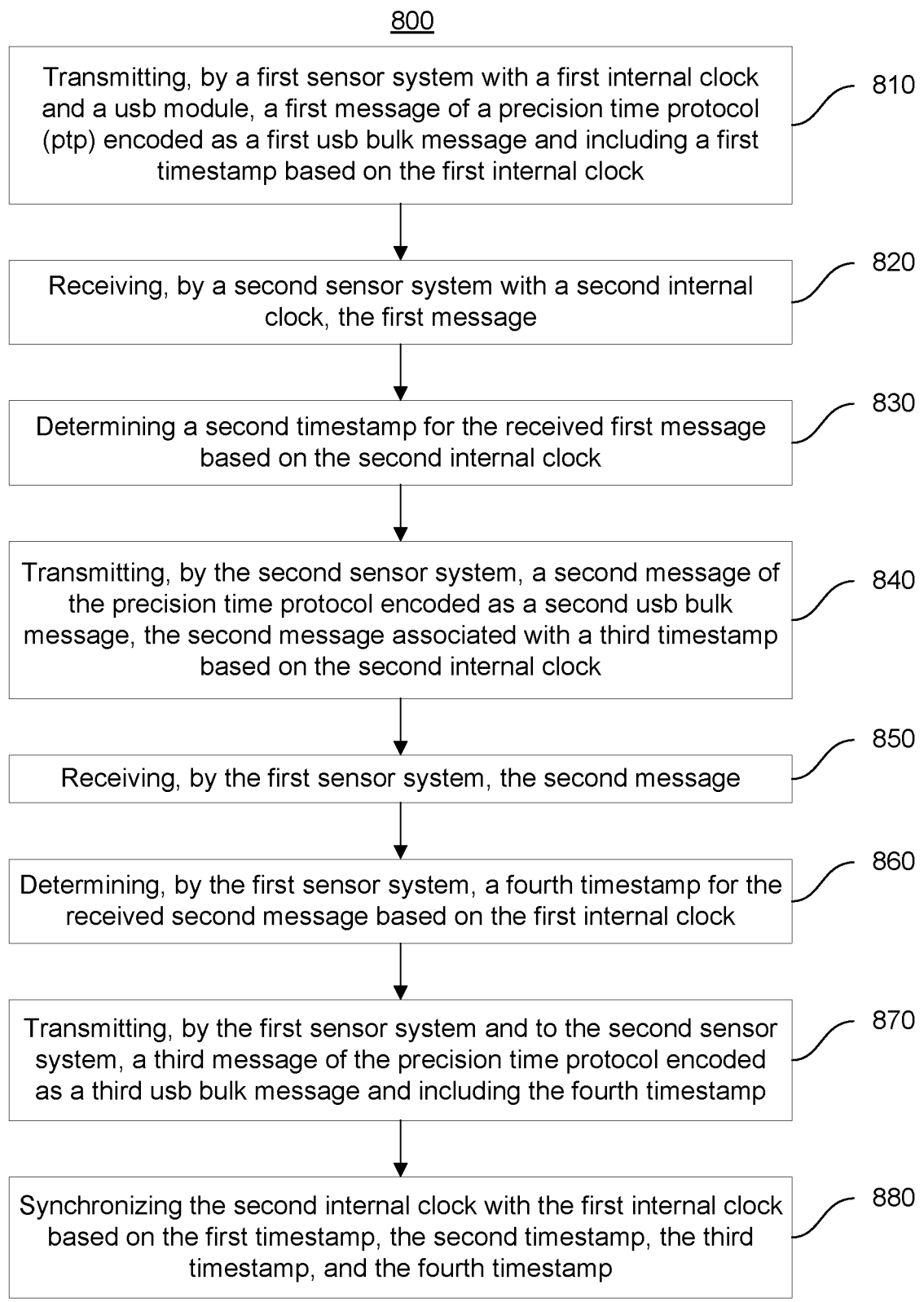
FIG. 8 is a flowchart of a process for synchronizing a sensor system with another sensor system that includes a client device, according to some embodiments.

FIG. 5 is a flowchart describing an example method 800 of synchronizing a sensor system with another sensor system that includes a client device, according to one embodiment. The steps of FIG. 8 are illustrated from the perspective of a data capture system (e.g., 400) performing the method 800. However, some or all of the steps may be performed by other entities or components. In addition, some embodiments may perform the steps in parallel, perform the steps in different orders, or perform different steps.

The data capture system includes a first sensor system (e.g., 410) and a second sensor system (e.g., 405 and 415). The first sensor system includes a first internal clock and a USB module. The second sensor system includes a second internal clock. Each of the sensor systems may include a sensor configured to generate data describing the environment.

At step 810, the first sensor system of the data capture system transmits a first message of a precision time protocol (PTP). The first message is encoded as a first USB bulk message and includes a first timestamp based on the first internal clock.

At step 820, a second sensor system of the data capture system receives the first message.

At step 830, the second sensor system determines a second timestamp for the received first message based on the second internal clock.

At step 840, the second sensor system transmits second message of the precision time protocol encoded as a second USB bulk message. The second message associated with a third timestamp based on the second internal clock.

At step 850, the first sensor system receives the second message.

At step 860, the first sensor system determines a fourth timestamp for the received second message based on the first internal clock.

At step 870, the first sensor system transmits, to the second sensor system, a third message of the precision time protocol encoded as a third USB bulk message and including the fourth timestamp.

At step 880, the second sensor system synchronizes the second internal clock with the first internal clock based on the first timestamp, the second timestamp, the third timestamp, and the fourth timestamp. Synchronizing the second internal clock with the first internal clock may include the second sensor system determining a time delay between the first and second timestamps and a time delay between the third and fourth timestamps, and the second sensor system adjusting the second internal clock based on the determined time delays.

The method 800 may further include, responsive to synchronizing the second internal clock with the first internal clock, the data capture system synchronizes data generation of a first sensor of the first sensor system with data generation of a second sensor of the second sensor system.

In some embodiments, the precision time protocol is performed periodically.

The method 800 may further include the second sensor system transmitting a set of two or more USB bulk messages within a threshold period with known timestamps to the first sensor system. The second sensor system may determine receive timestamps for the set of USB bulk messages, where the receive timestamps describe when the set of USB bulk messages were received by the first sensor system. Based on the receive timestamps and the known timestamps, the second sensor system may determine a bulk message frame boundary of the first sensor system. See descriptions with respect to FIGS. 7A-7F for more information.

IV. Example Computing System

Figure 9:
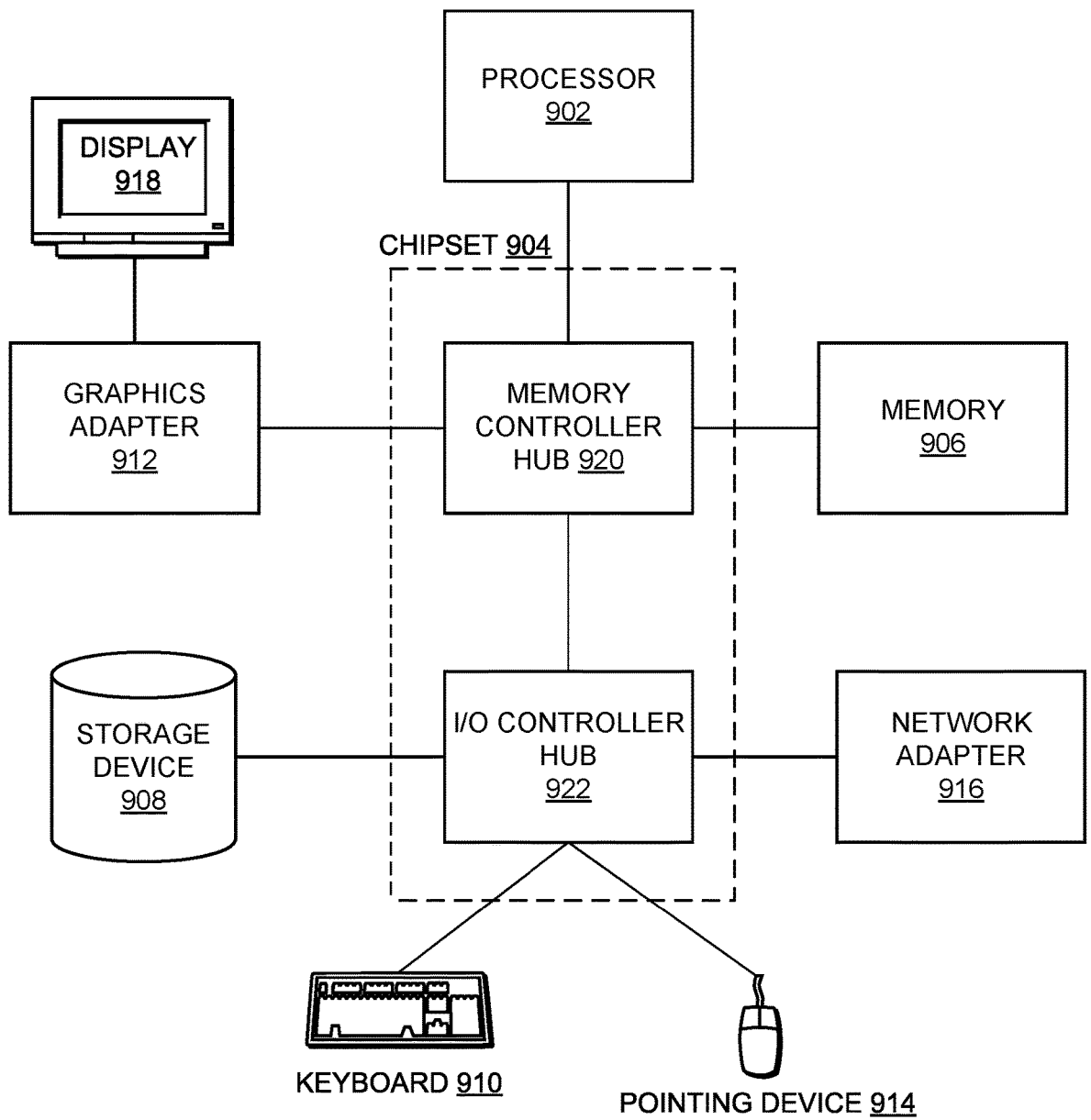
FIG. 9 illustrates an example computer system, according to some embodiments.

FIG. 9 is a block diagram of an example computer 900 suitable for use as a client device 310, game server 320, or client device 410. The example computer 900 includes at least one processor 902 coupled to a chipset 904. References to a processor (or any other component of the computer 900) should be understood to refer to any one such component or combination of such components working individually or cooperatively to provide the described functionality. The chipset 904 includes a memory controller hub 920 and an input/output (I/O) controller hub 922. A memory 906 and a graphics adapter 912 are coupled to the memory controller hub 920, and a display 918 is coupled to the graphics adapter 912. A storage device 908, keyboard 910, pointing device 914, and network adapter 916 are coupled to the I/O controller hub 922. Other embodiments of the computer 900 have different architectures.

In the embodiment shown in FIG. 9, the storage device 908 is a non-transitory computer-readable storage medium such as a hard drive, compact disk read-only memory (CD-ROM), DVD, or a solid-state memory device. The memory 906 holds instructions and data used by the processor 902. The pointing device 914 is a mouse, track ball, touch-screen, or other type of pointing device, and may be used in combination with the keyboard 910 (which may be an on-screen keyboard) to input data into the computer system 900. The graphics adapter 912 displays images and other information on the display 918. The network adapter 916 couples the computer system 900 to one or more computer networks, such as network 370.

The types of computers used by the entities described herein can vary depending upon the embodiment and the processing power required by the entity. For example, the game server 320 might include multiple blade servers working together to provide the functionality described. Furthermore, the computers can lack some of the components described above, such as keyboards 910, graphics adapters 912, and displays 918.

V. Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by one or more processors or equivalent electrical circuits, microcode, or the like (individually or together). Furthermore, it has also proven convenient at times, to refer to these arrangements of functional operations as modules, without loss of generality. A module can be implemented in hardware, firmware, software, or some combination thereof.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing the described functionality. Thus, while particular embodiments and applications have been illustrated and described, it is to be understood that the described subject matter is not limited to the precise construction and components disclosed. The scope of protection should be limited only by the following claims.

What is claimed is:

1. A system comprising:
    a first sensor system including a first internal clock, a first sensor configured to generate first data describing an environment, and a Universal Serial Bus (USB) module, wherein the first sensor system is a smartphone; and
    a second sensor system different from the first sensor system, the second sensor system comprising:
        a second sensor configured to generate second data describing the environment; and
        a controller comprising a second internal clock and configured to perform a precision time protocol (PTP) to synchronize the second internal clock with the first internal clock, the precision time protocol including transmitting timestamped messages encoded in USB bulk messages between the first sensor system and the second sensor system, wherein to synchronize the second internal clock with the first internal clock, the controller is further configured to adjust the second internal clock based on a time delay between the first internal clock and the second internal clock,
    wherein the controller is further configured to transmit first instructions to the first sensor system and transmit second instructions to the second sensor system based on the synchronization of the second internal clock with the first internal clock.

2. The system of claim 1, wherein the first instructions and the second instructions synchronize data generation of the first sensor with data generation of the second sensor.

3. The system of claim 1, wherein the timestamped messages are encoded in USB musical instrument digital interface (MIDI) bulk messages.

4. The system of claim 1, wherein to synchronize the second internal clock with the first internal clock, the controller is further configured to:
    determine the time delay between the first internal clock and the second internal clock based on the performed precision time protocol.

5. The system of claim 1, wherein the timestamped messages include a message from the first sensor system timestamped according to the first internal clock and a message from the second sensor system timestamped according to the second internal clock of the second sensor system.

6. The system of claim 1, wherein the precision time protocol using USB bulk messages comprises: calculating offsets and delays between timestamps of the timestamped messages transmitted between the first sensor system and the second sensor system.

7. The system of claim 1, wherein the controller is configured to perform the precision time protocol periodically.

8. The system of claim 1, to synchronize the second internal clock with the first internal clock, the controller is further configured to:
    transmit two or more USB bulk messages within a threshold period with known timestamps from the second sensor system to the first sensor system;
    determine receive timestamps for the two or more USB bulk messages, the receive timestamps describing when the two or more USB bulk messages were received by the first sensor system; and
    based on the receive timestamps and the known timestamps, determine a bulk message frame boundary of the first sensor system.

9. The system of claim 1, wherein the first sensor is an image sensor.

10. A method comprising:
    transmitting, by a first sensor system with a first internal clock and a USB module, a first message of a precision time protocol (PTP) encoded as a first USB bulk message and including a first timestamp based on the first internal clock, wherein the first sensor system is a smartphone;

receiving the first message by a controller module of a second sensor system different from the first sensor system, the controller module comprising a second internal clock;

determining, by the controller module, a second timestamp for the received first message based on the second internal clock;

transmitting, by the controller module, a second message of the precision time protocol encoded as a second USB bulk message, the second message associated with a third timestamp based on the second internal clock;

receiving, by the first sensor system, the second message;

determining, by the first sensor system, a fourth timestamp for the received second message based on the first internal clock;

transmitting, by the first sensor system and to the controller module, a third message of the precision time protocol encoded as a third USB bulk message and including the fourth timestamp;

synchronizing the second internal clock with the first internal clock based on the first timestamp, the second timestamp, the third timestamp, and the fourth timestamp, wherein synchronizing the second internal clock with the first internal clock comprises:
  determining a first time delay between the first internal clock and the second internal clock; and
  adjusting the second internal clock based on the first time delay; and transmitting, by the controller module, first instructions to the first sensor system and second instructions to the second sensor system based on the synchronization of the second internal clock with the first internal clock.

11. The method of claim 10, the first instructions and the second instructions synchronize data generation of a first sensor of the first sensor system with data generation of a second sensor of the second sensor system.

12. The method of claim 10, wherein the first, second, and third messages are encoded in USB musical instrument digital interface (MIDI) bulk messages.

13. The method of claim 10, wherein;
determining the first time delay between the first internal clock and the second internal clock comprises determining a second time delay between the first and second timestamps and a third time delay between the third and fourth timestamps; and
adjusting the second internal clock based on the first time delay comprises adjusting the second internal clock based on the second time delay and the third time delay.

14. The method of claim 10, wherein the precision time protocol is performed periodically.

15. The method of claim 10, further comprising:
transmitting a set of two or more USB bulk messages within a threshold period with known timestamps from the second sensor system to the first sensor system;
determining receive timestamps for the set of USB bulk messages, the receive timestamps describing when the set of USB bulk messages were received by the first sensor system; and
based on the receive timestamps and the known timestamps, determining a bulk message frame boundary of the first sensor system.

16. A non-transitory computer-readable medium storing instructions that, when executed by a computing system, cause the computing system to perform operations comprising:
  transmitting, by a first sensor system with a first internal clock and a USB module, a first message of a precision time protocol (PTP) encoded as a first USB bulk message and including a first timestamp based on the first internal clock, wherein the first sensor system is a smartphone;
  receiving the first message by a controller module of a second sensor system different from the first sensor system, the controller module comprising a second internal clock;
  determining, by the controller module, a second timestamp for the received first message based on the second internal clock;
  transmitting, by the controller module, a second message of the precision time protocol encoded as a second USB bulk message, the second message associated with a third timestamp based on the second internal clock;
  receiving, by the first sensor system, the second message;
  determining, by the first sensor system, a fourth timestamp for the received second message based on the first internal clock;
  transmitting, by the first sensor system and to the controller module, a third message of the precision time protocol encoded as a third USB bulk message and including the fourth timestamp;
  synchronizing the second internal clock with the first internal clock based on the first timestamp, the second timestamp, the third timestamp, and the fourth timestamp, wherein synchronizing the second internal clock with the first internal clock comprises:
    determining a first time delay between the first internal clock and the second internal clock; and
    adjusting the second internal clock based on the first time delay; and
  transmitting, by the controller module, first instructions to the first sensor system and second instructions to the second sensor system based on the synchronization of the second internal clock with the first internal clock.

17. The non-transitory computer-readable medium of claim 16, wherein the first instructions and the second instructions synchronize data generation of a first sensor of the first sensor system with data generation of a second sensor of the second sensor system.

18. The non-transitory computer-readable medium of claim 16, wherein the first, second, and third messages are encoded in USB musical instrument digital interface (MIDI) bulk messages.

19. The non-transitory computer-readable medium of claim 16, wherein;
determining the first time delay between the first internal clock and the second internal clock comprises determining a second time delay between the first and second timestamps and a third time delay between the third and fourth timestamps; and
adjusting the second internal clock based on the first time delay comprises adjusting the second internal clock based on the second time delay and the third time delay.

20. The non-transitory computer-readable medium of claim 16, wherein the precision time protocol is performed periodically.

* * * * *